April 3, 1951      J. F. PITTMAN      2,547,773
PORTABLE LOAD MOVING EQUIPMENT
Filed Sept. 22, 1947      2 Sheets-Sheet 1
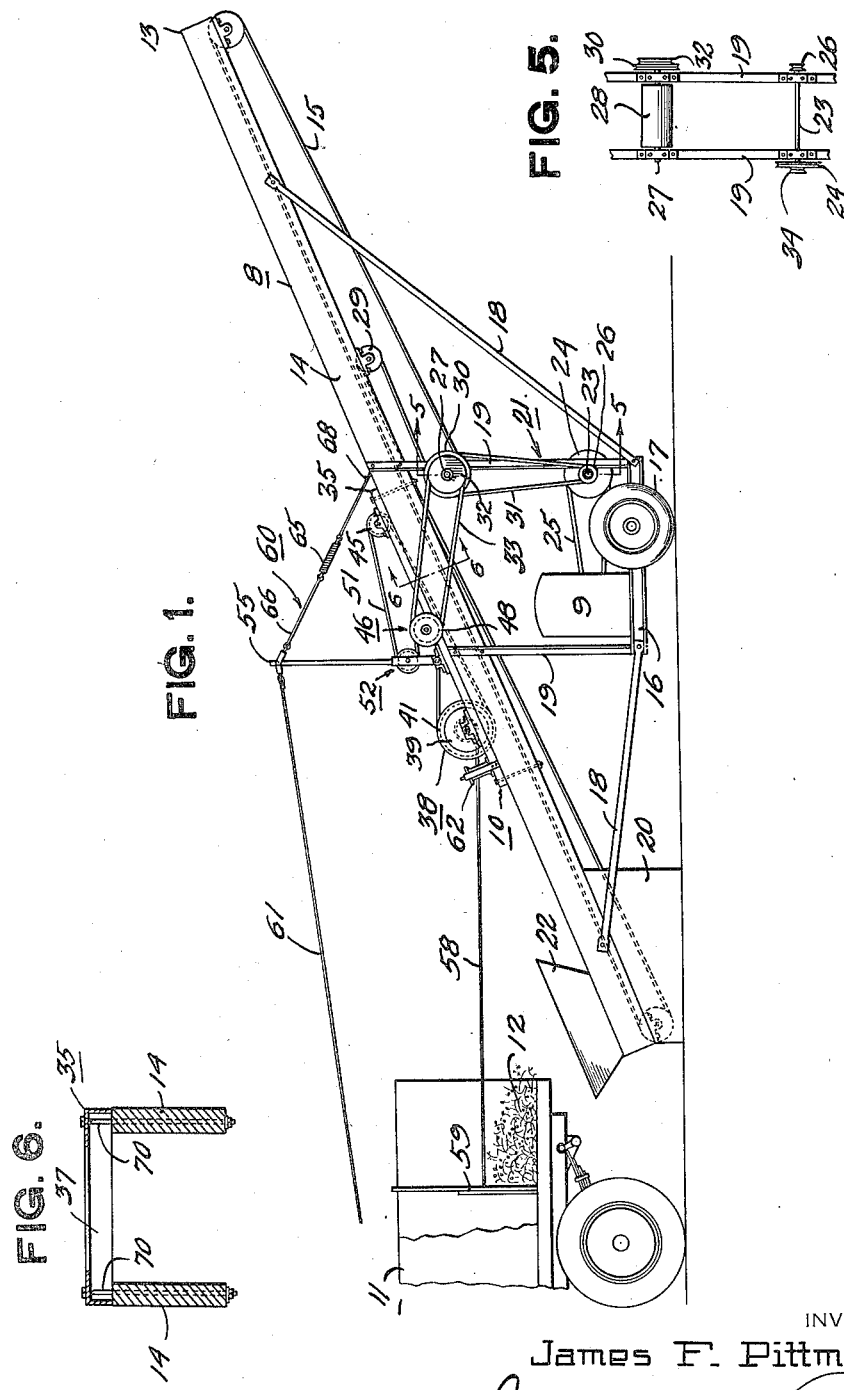
INVENTOR.
James F. Pittman
BY
ATTORNEYS.

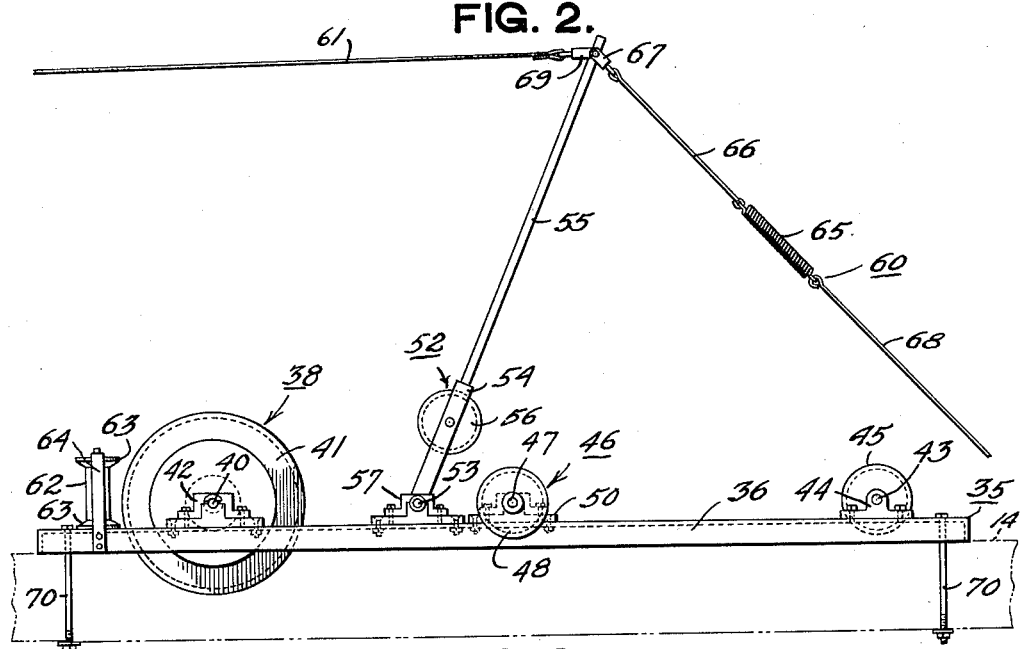
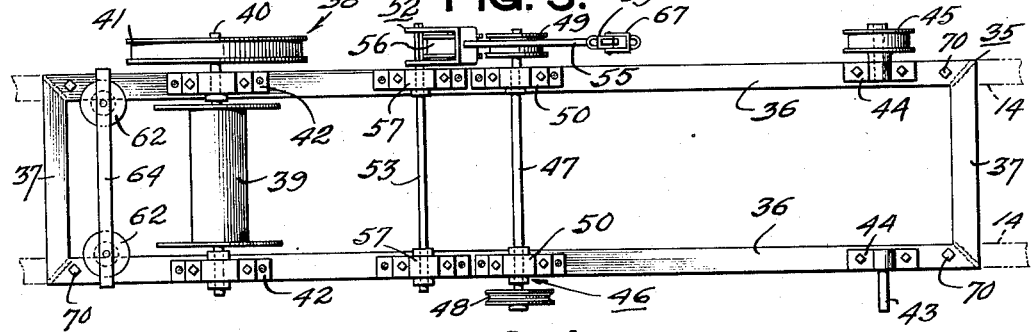
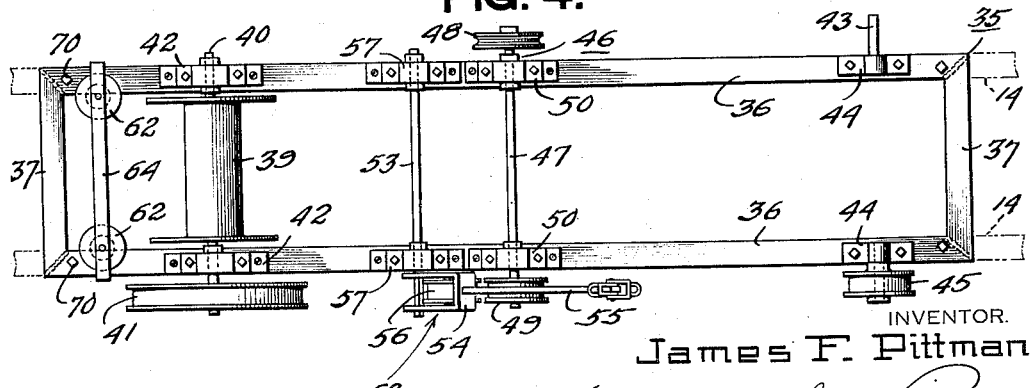

Patented Apr. 3, 1951

2,547,773

UNITED STATES PATENT OFFICE 2,547,773

PORTABLE LOAD MOVING EQUIPMENT

James F. Pittman, Jefferson County, near Gibson, Ga.

Application September 22, 1947, Serial No. 775,429

1 Claim. (Cl. 254—186)

This invention relates to portable equipment for moving produce, such as peanuts, potatoes, grain and cotton seed, and materials such as snow, sand, gravel and the like from one place to another.

In many sections of the country such produce and materials are moved by use of hand shovels, wheelbarrows, hand trucks and similar equipment requiring considerable time and labor. The harvesting seasons may be short, very large quantities of produce accumulate in a short space of time, and some of the materials to be moved are perishable, so there are large volumes to be transferred from place to place in a short period of time in order to get the materials stored or on their way to market. Snow and broken ice must also be disposed of in cities, in a short space of time and while power operated snow loaders are now available, they are usually fed by men using hand shovels.

The invention is particularly well adapted, altho not limited to use with portable conveyors or loaders of the endless belt or bucket type, generally available in the peanut, potato and cotton raising sections of the country, and municipalities in the North where the snowfall is frequent and heavy, these conveyors being equipped with motors for operating same.

The principal object of the invention is to provide portable load moving equipment which is low in cost of manufacture; labor saving, in that it requires the attendance of only two workmen for operation of each machine; and, capable of being operated from motors such as the motors of the portable conveyors or loaders referred to, the power take-off of tractors or trucks, or the transmission of prime movers usually installed in and about warehouses or in railway and trucking yards.

Another object is to provide such equipment which is adjustable, or having parts reversible, so that a particular piece of equipment may be adapted for use with power available at the particular site where it is to be used. In other words, the available shaft or pulley of the motor, or transmission therefrom, may be in a vertical plane to the right or to the left of the site most suitable for location of the load moving equipment, or the driveway available for a tractor or truck having a power take-off may run along either the right side or the left side of the site where it is desired to station the load moving equipment, and the invention makes possible quick and convenient adjustment under such condition, in most instances, without the necessity of adding extra countershafting, pulleys, belts, etc., to bring the power into proximity to the equipment when installed.

Other objects and advantages of the invention will appear in the following detailed description of a highly satisfactory embodiment of my invention, taken in connection with the accompanying drawings, forming a part of this specification, and in which drawings:

Fig. 1 is a view in side elevation of the equipment mounted on a portable conveyor of the inclined belt type. A portion of a truck carrying a load being moved by the equipment is also illustrated by way of example.

Fig. 2, a side elevation, on an enlarged scale of the major portion of the load moving equipment, certain flexible members such as belts, etc., being omitted so as to disclose details.

Fig. 3 is a plan view of the equipment shown in Fig. 2.

Fig. 4 is a view similar to Fig. 3 but showing some of the parts in a changed position to adapt same to receive power from the side opposite to that shown in Figs. 1 and 2.

Fig. 5 is a fragmentary sectional view on substantially the line 5—5 of Fig. 1.

Fig. 6 is a detailed sectional view, on an enlarged scale, on substantially the line 6—6 of Fig. 1, showing the manner in which the equipment may be mounted on a conveyor frame.

In the drawings I show a portable conveyor 8, provided with a motor 9 for operating same, load moving equipment 10, constructed according to the present invention, carried by the conveyor and operated by the motor thereof, and a truck 11 carrying a load 12.

As previously stated, the load moving equipment while not limited to use with a portable conveyor, is particularly well adapted for use therewith. In the example shown, the conveyor comprises a main frame 13 including spaced side rails 14 between which operates the upper run of an endless conveyor belt 15, a subframe 16 provided with ground wheels 17 by which the conveyor may be conveniently moved from place to place, the subframe being connected to the main frame by diagonal braces 18 and two sets of companion vertical braces 19 which dispose the main frame in a diagonal position as shown in Fig. 1, when a foot piece 20 at the lower end rests upon the ground, motion transmitting means 21, of a speed reducing type, actuated by the motor 9 and acting upon the lower run of the conveyor belt 15, and a hopper 22 at the foot end of the conveyor.

The motion transmitting means 21 comprises a lower transverse countershaft 23 carried by selected companion vertical braces 19 provided with a relatively large belt pulley 24 at one end portion, operated by an endless belt 25, driven by the motor 9, and having a relatively smaller belt pulley 26 at the other end portion of the shaft; an upper transverse shaft 27 carried by the vertical braces 19 provided with a driving drum 28 cooperating with an idle roller 29 carried by frame 13 and about which the lower run of the conveyor belt 15 is arranged in zig-zag fashion, the shaft 27 being provided with a relatively large driving pulley 30 in alignment with pulley 26 and an endless belt 31 operatively connecting pulleys 26 and 30. This motion transmitting means 21 is of a character to drive the conveyor belt 15 at a speed suitable for conveying the material according to its weight and other characteristics, the motor speed usually being too fast for more direct drive between the motor shaft and driving drum 28.

It is proposed, when the equipment 10 is applied to a portable conveyor to take power from some available shaft of the transmission means 21, a selection being made so as to not operate the moving parts of the load moving equipment too fast or too slow. In the example shown, power is taken from the shaft 27, by attaching a suitable belt pulley 32 thereto about which is trained an endless belt 33 operating the equipment 10 as hereinafter described. Or, a double pulley may be substituted for the one conventionally used to drive the drum shaft 27 if there is not sufficient shaft end portion for the reception of pulley 32. In some makes and models of portable conveyors, the driving pulley 30 is on the right side of the conveyor as viewed from the foot end; in others, on the left side. Also in some makes and models, the countershaft 23 may rotate at a speed suitable to take power therefrom, for operating the equipment 10, under which circumstance, a relatively small belt pulley 34, as shown in Fig. 5 may be applied to the left end thereof. It is for this reason, as well as others, that the equipment is preferably made so that certain parts are reversible to adapt it to the particular portable conveyor with which it is used; in other words, to adapt it to conditions where the available power take-off, best suited for its operation, is on the left side or the right side of the equipment when viewed from the load receiving end. Other conditions when such reversible arrangement is desirable is where the driveway for a truck or tractor having a power take-off for operating the equipment, is to the left of the equipment during one job and to the right of the equipment during another or different job.

The load moving equipment comprises, in the example shown, an elongated frame 35 consisting of spaced, parallel side rails 36 and spaced, parallel end rails 37; a winding assembly 38, at one end of frame 35, including a drum 39, a shaft 40 therefor, and a belt pulley 41 at one end of the shaft spaced laterally of the drum; companion bearings 42, carried by the side rails 37 adjacent one end of the frame 35 supporting the shaft 40 transversely of the frame with the drum 39 in the zone between the side rails 36 and the pulley 41 outside the frame at a selected side thereof; a pair of stub shafts or dead axles 43 secured to the side rails 36, as by fixed brackets 44, and extending laterally of the frame; a belt pulley 45 detachably mounted on a selected one of the stub shafts 43; a driving assembly 46 comprising a shaft 47, a driving pulley 48 on one end of the shaft 47 and a driven pulley 49 on the other end of said shaft in alignment with pulley 41; companion bearings 50 carried by the side rails 36 intermediate the companion bearings 42 and the stub shafts 43 supporting the shaft 47 transversely of the frame 35 with the pulleys 48 and 49 exteriorly of the frame and with the driven pulley 49 in alignment with the pulleys 41 and 45; an endless belt 51 trained about the pulleys 41 and 45, and with one of the runs of the belt between the pulleys 41 and 45 engaging the driven pulley 49; adjustable tightening mechanism 52 for belt 51 preferably comprising a shaft 53, a fork 54 on one end portion of the shaft and provided with a control lever 55, an idle belt pulley 56 carried by the fork, about which the belt 51 is trained in zig-zag relation with the driven pulley 48 and the pulleys 41 and 45 and companion bearings 57 carried by the side rails 36 between the companion bearings 42 and 50 supporting the shaft 53 crosswise the frame 35; a flexible draw line 58 connected at one end to the drum 39 in any suitable manner to be wound thereupon for moving the load; and a drag scoop 59 connected to the other end of the draw line.

In operation, upon movement of the lever 55 in one direction, such as counterclockwise as shown in Fig. 1, the idle pulley is moved to tension the belt 51 against the pulley 49 which imparts movement to the belt and hence to the pulley 41, shaft 40 and drum 39, winding the draw line upon the drum. If moved in a counterdirection the idle pulley 41 is moved to a non-tensioning position and the drum 39 is free to rotate responsive to pull upon the draw line 58.

It is preferred to provide means 60 for normally retaining the idle pulley 56 in a non-tensioning position, and a flexible member 61 operatively connected to lever 55 for remote control thereof. There may also be provided vertically disposed guide rollers 62, provided with upper and lower flanges 63, rotatably about an upright axis and carried by the frame 35 at the end portion adjacent the winding assembly 38, by a frame 64 secured to the frame 35.

The means 60 may comprise a tension spring 65 having one end portion connected, by link 66 to lever 55 by a clevis 67 and to some stationary element, such as the conveyor frame 8, by link 68. The flexible member 61 may be connected to lever 55 by a clevis 69 and may extend therefrom in any direction counter to means 60 and may be manually operated by a workman stationed at a point where he may observe the position of the drag scoop 59 with respect to the load and the foot end of the conveyor or other zone to which the load is moved by the equipment. The guide rollers provide means for guiding the draw line 58 for proper winding upon the drum 39 even tho the draw line extends from the equipment in acute or obtuse angular relation to the longitudinal axis thereof.

The companion bearings 42, 50 and 57 are preferably of a type permitting of ready removal of their respective shafts and relocation thereof, end for end, such as bearings having the usual base and detachable cap as shown in Figs. 1 and 2. By this arrangement, the driving pulley 48 may be located on either side of the frame 35 and the pulleys 41, 49 and 56 at the side of the frame 35 opposite to that where the pulley 48 is located, as may be observed from a comparison of Figs. 3 and 4. Also the pulley 45 may be placed on the stub shaft 43 located at the side of the frame where the pulleys 41, 49 and 56 are located.

The frame 35 may be secured upon the side rails 14 by suitable bolts 70, the frame being made sufficiently wide to fit the maximum width of portable conveyors of the type shown, when intended for cooperation therewith.

It will be noted that the load moving equipment constructed according to the present invention may be operated by two workmen, one to position, and guide the drag scoop 59 and draw it back to a position for a new load, and another workman to control the position of the idle pulley 56 of the belt tightening mechanism 52. The latter workman may station himself on or adjacent the frame 35 in proximity to lever 55 to directly operate it, or remote from the lever, such as in proximity to the material to be moved, and operate the lever 55 thru flexible member 61. The guide rollers also permit the drag line to lead off from the equipment at various angles to the horizontal.

It will be noted that all pulleys are outside the opening of the frame where they in no way interfere with the material being moved by the conveyor, when the equipment is used with a conveyor of the general character shown in the drawing. It is also preferred to dispose the drawline so that it runs tangential to the lower portion of the drum and to rotate the drum in a direction that it will assist rather than retard movement of any of the material in the conveyor which may come in contact with the drum or draw line. In other words, the drum as viewed in Fig. 1, rotates in a counter-clockwise direction.

I claim:

In portable load moving equipment, the combination of an elongated frame including spaced, longitudinally extending side rails; a winding assembly comprising a drum, a first shaft therefor and a first belt pulley on one end of the shaft, spaced laterally of the drum; companion first bearings carried by said side rails adjacent one end of the frame, supporting said drum shaft transversely of the frame with said drum in the zone between the side rails and the belt pulley exteriorly of the frame, said first bearings constructed and arranged to permit relocation of the winding assembly, end for end; a pair of stub shafts carried by said side rails adjacent the end of the frame, opposite to said bearings, said stub shafts extending laterally of the frame; a second belt pulley carried by one of said stub shafts in alignment with said first pulley and transferable to the other stub shaft when the winding assembly is reversed end for end; a driving assembly comprising a second shaft, a driving pulley at one end thereof and a driven pulley at the opposite end of the shaft; companion second bearings carried by said side rails intermediate said companion first bearings and said pair of stub shafts, supporting said second shaft transversely of the frame with said driven pulley in alignment with said first and second pulleys at one exterior side of the frame and said driving pulley at the opposite exterior side of the frame, said second bearings constructed and arranged to permit relocation of the driving assembly, end for end; an endless belt trained about said first and second belt pulleys and a run of said belt therebetween trained about said driven pulley of the driving assembly; adjustable tightening mechanism for said belt, carried by said frame, including an idle pulley located exteriorly of the frame, in alignment with said first, second and driven pulleys, about which said run of said belt is trained and a lever for moving said idle pulley to tensioning and non-tensioning positions with respect to the belt, said tightening mechanism constructed and arranged for transfer to either side of the frame; a flexible draw line connected at one end portion to said drum; and a drag scoop connected to the other end portion of the draw line.

JAMES F. PITTMAN.

REFERENCES CITED

The following references are of record in the file of this patent:

UNITED STATES PATENTS

| Number | Name | Date |
|---|---|---|
| 1,315,429 | Sotka | Sept. 9, 1919 |
| 1,426,654 | Kruse | Aug. 22, 1922 |
| 1,707,119 | Good | Mar. 26, 1929 |
| 1,709,449 | Watters | Apr. 16, 1929 |